(12) United States Patent
Schaller

(10) Patent No.: US 8,086,780 B2
(45) Date of Patent: Dec. 27, 2011

(54) METHOD FOR TRANSFER/TRANSMISSION OF FIELD BUS DATA AND FIELD BUS COMMUNICATION SYSTEM

(75) Inventor: Ralf Schaller, Reichelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 12/341,840

(22) Filed: Dec. 22, 2008

(65) Prior Publication Data

US 2009/0164676 A1    Jun. 25, 2009

(51) Int. Cl.
*G06F 13/14* (2006.01)
(52) U.S. Cl. .................... 710/305; 710/306; 710/100
(58) Field of Classification Search .................. 710/110, 710/305–306
See application file for complete search history.

(56) References Cited

U.S. PATENT DOCUMENTS

| 5,926,648 | A  | * | 7/1999 | Ayzenberg ........................ 710/3 |
| 6,675,236 | B2 | * | 1/2004 | Moon et al. ..................... 710/29 |
| 6,907,488 | B1 | * | 6/2005 | Diehl ........................... 710/305 |
| 6,912,566 | B1 |   | 6/2005 | Barrenscheen et al. |
| 7,702,834 | B2 | * | 4/2010 | Beckhoff et al. ............. 710/110 |
| 2008/0151287 | A1 | * | 6/2008 | Birkenfeld et al. .......... 358/1.15 |

FOREIGN PATENT DOCUMENTS

| DE | 101 14 187 B4 | 10/2006 |
| DE | 10 2005 060 085 A1 | 6/2007 |
| WO | WO 2006/036201 A1 | 4/2006 |
| WO | WO 2007/102779 A1 | 9/2007 |

\* cited by examiner

*Primary Examiner* — Paul R Myers
*Assistant Examiner* — Kim Huynh
(74) *Attorney, Agent, or Firm* — Lathrop & Gage LLP

(57) ABSTRACT

Methods for the transfer/transmission of field bus data between at least two members of a field bus communication system, each member including at least one field bus interface and a memory device. At least one common memory device is provided for the at least two members, wherein field bus data is written onto the at least one common memory device by the first member, and the field bus data is read out of the at least one common memory device by the second member. A field bus communication system includes at least one member, where each member includes a field bus interface and a memory device. The field bus communication system further includes at least one common memory device writeable from and readable to the members of the field bus communication system.

18 Claims, 1 Drawing Sheet

METHOD FOR TRANSFER/TRANSMISSION OF FIELD BUS DATA AND FIELD BUS COMMUNICATION SYSTEM

CROSS-REFERENCE TO RELATED APPLICATIONS

This application claims benefit of priority to German Patent Application No. 10 2007 062 387.0, filed 22 Dec. 2007, which is incorporated herein by reference.

BACKGROUND

There exist a number of field bus communication systems, in which various members are arranged in direct vicinity, such as on a rack. For example, in a serial real time communication system (such as SERCOS) application, a master and slaves are centrally arranged. The members are connected to one another by means of common field bus communication devices, such as via Ethernet in SERCOS III applications.

As conventionally known (see, for example, Wikipedia article entitled "SERCOS interface"), signals and commands sent between control modules in industrial control systems must be coordinated. Tight coordination is sometime required, and especially in applications requiring motion control. Examples of equipment requiring tight coordination include metal cutting machine tools, metal forming equipment, assembly machinery, packaging machinery, robotics, printing machinery, and material handling equipment. The SERCOS interface standard is an international standard for digital motion control buses that interconnect, for example, motion control devices, drives, input/output devices, sensors, and actuators for numerically controlled machines. SERCOS, for example, provides for high-speed serial communication of standardized, closed loop, real-time data.

In the central adjacent arrangement of a number of members of a field bus communication system, there exists a problem in that the mutual connection of the members by means of conventional field bus physics or hardware requires substantial and fault-prone wiring in limited space.

SUMMARY

One object is to facilitate the transfer of field bus data, especially so that wiring complexity and effort can be reduced. This object is achieved, for example, by a method for transfer of field bus data between at least two members of a field bus communication system, a member of a field bus communication system, a field bus communication system, a computer program and/or a computer program product with features such as those of the respective independent claims.

A member of a field bus communication system according to the invention, for example, includes suitable means or is correspondingly provided in order to perform at least one method according to the invention.

A field bus communication system according to one embodiment of the invention includes at least two members.

Although examples of SERCOS communication systems are provided in this document, the invention is not limited thereto, but can rather be utilized in all types of field buses.

In an embodiment, a method for transfer of field bus data between at least two members of a field bus communication system, where each member includes a field bus interface and a memory device, includes (1) writing field bus data by a first member into at least one common memory device, and (2) reading the field bus data from the at least one common memory device by a second member.

In an embodiment, a field bus communication system includes at least one member, where each member includes a field bus interface and a memory device. The field bus communication system further includes at least one common memory device writeable from and readable to the members of the field bus communication system. Each member is operable to perform at least one of the follow actions: (1) writing field bus data to the at least one common memory device, and (2) reading field bus data from the at least one common memory device.

In an embodiment, a computer program for transferring field bus data between at least two members of a field bus communication system is stored on a computer readable medium. The computer program includes instructions which, when executed by a computer, perform the steps of (1) writing field bus data by a first member into at least one common memory device, and (2) reading the field bus data from the at least one common memory device by a second member.

DETAILED DESCRIPTION OF DRAWINGS

Figure 1:
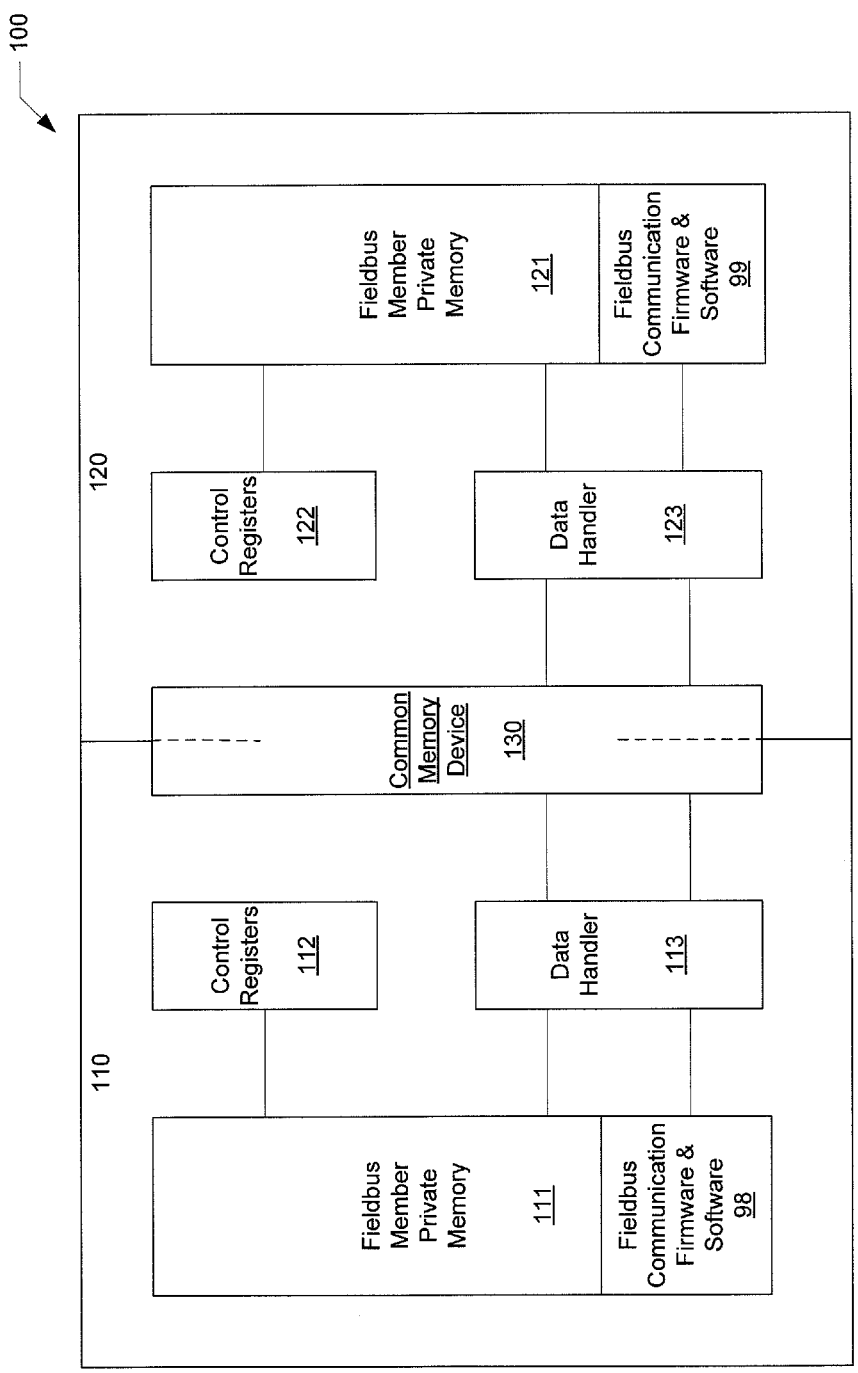
FIG. 1 shows a schematic representation of two members of a field bus communication system with a common memory device, according to an embodiment.

In some embodiments, members of a field bus communication system can be connected without field bus wiring having to be provided. Real time capable, centrally arranged field bus member communication can be provided without the need for the bus physics of the field bus. Advantageously, it is possible to design the communication transparently, in order to be able to continue using communication firmware 98, 99 (FIG. 1) of the members.

Advantageous embodiments are the subject of dependent claims as well as the following description.

Advantageously, in some embodiments, a member will continue to comprise a field bus controller, for example in the form of an FPGA in order to operate the field bus interface, a memory device associated with the field bus controller, especially a RAM region of an FPGA, being emulated in a memory device of the member. Emulation means the functional imitation of a system through another. An example of a suitable field bus controller is a Sercon100M or Sercon100S controller. It is expedient to provide the emulation of the field bus controller, for example the SERCOS III and Slave FPGAs, in the firmware 98, 99, of the members 110, 120, wherein in the RAM 111, 121, of each member for example, a memory region is provided which corresponds to the FPGA-RAM interface of the hardware components. Correspondingly provided register and data handlers then provide the data exchange via the common memory device. The controllers control the whole transfer transmission as for example timing, synchronization and processing of cyclical and non-cyclical data on the basis of two integrated Ethernet-MACs. This task is performed, for example, by the register and data handlers.

Expediently, a multi port RAM memory device, especially with connection over a PCI bus to each member 110, 120, is for example, provided as the at least one common memory device 130. An expedient common memory device is for example a dual port RAM memory device with two ports. Via the internal communication over a multiport RAM memory device, a high transmission security can be achieved.

Preferably, at least one real time data transmission channel and/or a non-real time data transmission channel are provided for transfer/transmission of field bus data between the members via the common memory device. Herewith, the invention is applicable for a multitude of field bus standards. For example in field bus communication according to the standard "SERCOS interface", a transmission channel for a cyclical, real time capable data transmission as well as a transmission channel for a non-cyclical data transmission are provided.

According to an embodiment, data transmission is provided according to a standard "SERCOS interface," especially according to "SERCOS III." The SERCOS interface defines cyclical, synchronous and equidistant data communication between a communication master (typically: NC control) and a number of communication slaves (typically: drives or decentral I/O stations). The data, which herein is transmitted cyclically from the master to the slaves, is included in the master data telegram (MDT) and in a (SERCOS III) or a number of (SERCOS II) drive data telegrams (AT), the transmission according to this embodiment of the invention not being achieved via conventional SERCOS bus physics, but via a common memory device. For master and slave members, cyclical (MDT, AT) as well as non-cyclical (service data channel operations) communication services can be provided in real time without the need for SERCOS bus physics. Large parts of an existing communication firmware can for example continue to be used or used again. With some embodiments of the invention, a high communication security is provided by means of an internal connection.

Embodiments of the invention also relate to a computer program with program code means suitable for performing a method according to the invention, if the computer program is performed on a computer or a corresponding computing unit, especially a member of a communication system according to the invention.

The computer program product according to some embodiments of the invention comprises program code means stored on a computer readable medium or a computer readable data carrier, which is suitable to perform a method according to the invention if the computer program is performed on a computer or a corresponding computing unit, especially a member of a communication system according to the present invention. Suitable computer readable mediums or data carriers include, for example, discs, fixed discs, flash memories, EEPROMs, CD-ROMs, DVDs etc. Also, a download of such computer programs via computer networks (internet, intranet, etc.) is possible in some embodiments.

Further advantages and embodiments follow from the description and the appended drawings.

It is to be understood that the previously mentioned features as well as the features mentioned below are useable not only in the respectively stated combinations, but also in other combinations or alone, without departing from the scope of the invention.

The invention is schematically shown in the drawing by means of one embodiment, and will now be described in connection with the drawing.

In FIG. 1, an embodiment of a communication system according to the invention is schematically shown and designated 100. The communication system 100 is provided as a field bus communication system according to the standard "SERCOS III" and includes at least two members 110 and 120. Member 110 is provided in the shown example as a SERCOS III master, for example as controller, and member 120 as a SERCOS III Slave, for example as drive control device. The field bus members 110 and 120 are arranged for example on a common rack and are provided with at least one common memory device 130, such as a dual port RAM memory device. Furthermore, each of the field bus members 110, 120 includes its own memory device 111, 121 provided as a RAM memory device. Furthermore, the field bus members 110, 120 are each provided with a register handler 112, 122 and a data handler 113, 123.

According to the illustrated embodiment of the invention, a memory interface of a field bus controller, for example SERCON100M, is emulated in the memory device 111. Also, in the memory device 121 a memory interface of a field bus controller, for example SERCON100S, is emulated.

The field bus communication is performed not via the also provided field bus physics, as for example an Ethernet connection, but via the common memory device 130. To this end, the existing firmware 98, 99 can advantageously continued to be used for addressing the field bus controller, whereby the field bus connection for the controller or the drive control devices can be performed transparently, without having to take into consideration specific features of the common memory device 130. To this end, the data to be transmitted is transferred to the memory interfaces of the field bus controller emulated in the memory areas 111 or 121 respectively. The existing register and data handlers 112 or 122 and 113 or 123 provide the data exchange via the dual port RAM memory device 130.

In order to ensure the re-usability of often complex communication software included in 98, 98, the RAM interface of the FPGA components is for example copied or emulated in the firmware. The communication firmware of the bus members, which completely refers to this interface, can be taken over without modification. The emulation of the hardware components and the data transfer over the PCI-bus based dual port RAM connection are decoupled from the remaining communication firmware 98, 99, and can simply be integrated in the existing member firmware components. The re-usability of the communication firmware is no longer dependent on the SERCOS III bus physics (hardware).

In order to ensure the re-usability of often complex communication software, the RAM interface of the FPGA components is for example copied or emulated in the firmware. The communication firmware of the bus members, which completely refers to this interface, can be taken over without modification. The emulation of the hardware components and the data transfer over the PCI-bus based dual port RAM connection are decoupled from the remaining communication firmware, and can simply be integrated in the existing member firmware components. The re-usability of the communication firmware is no longer dependent on the SERCOS III bus physics (hardware).

The RAM interface of the FPGA components (for example SERCON100M and SERCON100S) is for example identical for the conventional hardware based and the preferred solution for the communication firmware. The SERCOS III bus physics is replaced by a register and data handler, which is integrated in the existing member firmware components of master and slave. A PCI bus based dual port RAM servable from both sides serves for data exchange.

It is to be understood that the figures show only one embodiment of the invention. Next to this, any other embodiment is conceivable without departing from the scope of the invention.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for transfer of field bus data between at least two members of a field bus-compatible communication system, each member comprising a field bus interface and at least one memory device, the method comprising:
   writing field bus data by a first member into at least one common memory device; and
   reading the field bus data from the at least one common memory device by a second member, the common memory device separate from the memory device of each member;
   wherein the at least one common memory device is a multiport random-access memory (RAM) device writeable from and readable to at least two of the first and the second members of the at least two members of the field bus communication system through the field bus interface without communicating over a field bus physical layer, and
   wherein the field bus communication system is compatible with field bus firmware adapted for communicating over a field bus physical layer.

2. The method of claim 1, wherein at least one member further comprises a respective field bus controller for operating the member's respective field bus interface, and wherein a memory device associated with the at least one member's respective field bus controller is emulated in the respective memory device of the member.

3. The method of claim 1, further comprising providing at least one of a real time data transmission channel and a non-real time data transmission channel for transmitting the field bus data between the members via the common memory device.

4. The method of claim 1, the field bus data being transferred between the common memory device and the members according a SERCOS interface standard.

5. The method of claim 4, the SERCOS interface standard being a SERCOS III interface standard.

6. The method of claim 1, wherein at least two members interface with an industrial control system.

7. The method of claim 6 wherein at least two members are one or more of motion control devices, drives, input/output devices, sensors, and actuators.

8. The method of claim 6, wherein at least two members are one or more of metal cutting machine tools, metal forming equipment, assembly machinery, packaging machinery, robotics, printing machinery, and material handling equipment.

9. A field bus-compatible communication system, comprising:
   at least two members, each member including:
   a field bus interface,
   field bus communications firmware adapted for communicating between members over a field bus physical layer, and
   a memory device; and
   at least one common memory device writeable from and readable to at least two of the at least two members of the field bus communication system through the field bus interface without communicating over a field bus physical layer,
   each member being operable to perform at least one of the follow actions:
   writing field bus data to the at least one common memory device, and
   reading field bus data from the at least one common memory device.

10. The system of claim 9, at least one member being operable to emulate a field bus controller in the member's respective memory device, the field bus controller for operating the member's respective field bus interface.

11. The system of claim 9, at least one common memory device comprising a multiport RAM memory device.

12. The system of claim 9, at least one member and at least one common memory device being operable to communicate according to a SERCOS interface standard.

13. The system of claim 12, the SERCOS interface standard being a SERCOS III interface standard.

14. The system of claim 9, further comprising at least two members.

15. The system of claim 9, wherein at least one member is one of a motion control device, an actuator, a metal cutting machine tool, metal forming equipment, assembly machinery, a packaging machine, a robot, a printing machine, and material handling equipment.

16. A computer readable medium on which is stored a computer program for transferring field bus data between at least two members of a field bus-compatible communication system, the computer program comprising instructions which, when executed by a computer, perform the steps of:
   writing field bus data by a first member into at least one common memory device; and
   reading the field bus data from the at least one common memory device by a second member;
   wherein the at least one common memory device is writeable from and readable to at least two of the at least two members of the field bus communication system through the field bus interface without communicating over a field bus physical layer, and
   wherein the field bus communication system is compatible with field bus firmware adapted for communicating over a field bus physical layer.

17. A method for transfer of field bus data between at least two members of a fieldbus-compatible communication system, each member comprising a field bus interface and a memory device, the method comprising:
   writing field bus data by a first member into at least one common memory device; and
   reading the field bus data from the at least one common memory device by a second member;
   wherein the at least one common memory device is writeable from and readable to each of the at least two members of the field bus communication system without communicating over a serial field bus physical layer, and
   wherein the field bus interface is compatible with field bus firmware adapted for communicating over a serial field bus physical layer.

18. The method of claim 17, wherein at least one member further comprises a respective field bus controller for operating the member's respective field bus interface, and wherein a memory device associated with the at least one member's respective field bus controller is emulated in the common memory device.

* * * * *